United States Patent [19]
Benest

[11] Patent Number: 5,615,617
[45] Date of Patent: Apr. 1, 1997

[54] WHEEL HEAD AND RAIL ASSEMBLY

[76] Inventor: Roger S. Benest, Manor House Farm, Rue de Bas, St. Lawrence, Jersey, Channel Islands

[21] Appl. No.: 433,443

[22] PCT Filed: Nov. 10, 1993

[86] PCT No.: PCT/GB93/02316

§ 371 Date: Jul. 3, 1995

§ 102(e) Date: Jul. 3, 1995

[87] PCT Pub. No.: WO94/11228

PCT Pub. Date: May 26, 1994

[30] Foreign Application Priority Data

Nov. 10, 1992 [GB] Channel Islands ................ 9223505.0
Nov. 17, 1992 [GB] Channel Islands ................ 9224105.8

[51] Int. Cl.$^6$ .............................................. B61B 3/02
[52] U.S. Cl. ........................... 104/94; 104/93; 104/139; 105/150
[58] Field of Search .................... 104/89, 91, 93, 104/94, 95, 118, 119, 139; 105/141, 144, 148, 150, 154, 155; 16/87 R, 91, 97

[56] References Cited

U.S. PATENT DOCUMENTS

| 3,044,820 | 7/1962 | Cox | 295/7 |
| 3,091,189 | 5/1963 | Becker | 104/94 |
| 3,238,894 | 3/1966 | Maksim, Jr. . | |
| 3,791,308 | 2/1974 | Hartz | 104/139 |
| 3,879,799 | 4/1975 | Williams | 104/94 |
| 3,916,798 | 11/1975 | Ishii et al. | 104/139 |
| 4,401,033 | 8/1983 | Gerkin | 104/94 |
| 5,181,296 | 1/1993 | Williams | 104/94 |

FOREIGN PATENT DOCUMENTS 2190343 11/1987 United Kingdom .
9302552 2/1993 WIPO .

Primary Examiner—S. Joseph Morano
Attorney, Agent, or Firm—Brooks & Kushman P.C.

[57] ABSTRACT

A wheel head and rail assembly comprises a contra-rotatable wheel assembly (20) and associated rails (16, 18). Successive wheels (42, 44, 46) on the assembly contact, alternately, the rails (16, 18) on opposite sides thereof. The wheel head can provide a mounting for a carriage which carries, for example, a dropleg (22) with a spray nozzle for use on an agricultural crop sprayer.

9 Claims, 2 Drawing Sheets

WHEEL HEAD AND RAIL ASSEMBLY

This invention relates to a wheel head and rail assembly and to a corresponding drive system provided thereby, whether including a corresponding source of torque such as a motor or otherwise provided with means for moving the wheel head lengthwise of the rail assembly.

In this application, references to "drive" refer to the transmission of torque from a source thereof, for example an electric motor, to wheels, or an equivalent thereof, for effecting movement of he wheels, and for example a structure mounted thereon, lengthwise of a surface engaged by the wheels for drive purposes.

An application of the invention is to a mounting and/or drive system for a carriage to be used in an agricultural or horticultural sprayer to provide a mounting for spray heads to be moved lengthwise of a sprayer boom. In such an application, the drive will usually be effected by means of wheels engaging a track.

The invention may also find application to related carriage and/or drive systems including industrial applications generally, particularly those where the carriage or drive have to operate in a hostile environment, and there is required a self-propelled carriage for transportation purposes.

Shortcomings of presently available or published carriage systems for use in the above-mentioned type of situations include limitations on the distance in which the carriage can move, these being imposed by such factors as cable length, in the case of cable drives. Other shortcomings include a lack of stability and susceptibility to hostile environments, general complexity, and a lack of reliability.

Accordingly, we have identified a need for a wheel head and rail assembly offering improvements in relation to one or more of the matters mentioned above, or improvements generally.

According to the invention there is provided a wheel head and rail assembly as hereinafter defined.

In an embodiment, the wheel head and rail assembly provide a single axis carriage and/or drive system, or a system having more than one axis, but these axes being closely spaced, as explained below. The wheels are mounted between spaced rails. The rails may be of a variety of forms, according to the form of the wheel head, and being complementary thereto.

Also in an embodiment, a rail assembly is provided for a contra-rotatable wheel assembly, the rails having dispositions to enable each rail to co-operate with one of the contra-rotatable wheels. In accordance with the invention, a carriage and associated optional drive comprises a single or dual axis contra-rotatable wheel assembly. In a preferred embodiment, a motor drive is arranged co-axially with the axes or with one of the axes of the wheel assembly. The motor drive may be mounted directly on the wheel assembly. The assembly of motor and rails may be enclosed in a housing providing protection from above and/or below in relation to a hostile operating environment.

In the embodiment, the wheel assembly comprises a minimum of two contra-rotating wheels. Successive wheels arranged each below the other make contact with the spaced rails alternately on one rail, and then the other.

By the provision of a contra-rotatable wheel assembly in accordance with certain aspects of the invention, there is provided a mounting and an optional drive which is particularly compact and stable. The carriage and drive is able to traverse the full length of any rail system provided for it. Where a drive is not required, the wheel head enables position adjustment of the carriage, or even of just the wheel head lengthwise of the rails. Means may be provided to control movement of the wheel head along the rails. Such means may comprise a braking assembly whereby the wheel head can move when a pre-determined force or torque is applied thereto, whereby, in use, a structure mounted on the, carriage is provided with operating characteristics enabling it to move under certain conditions encountered during use.

Manufacturing costs are relatively low due to the simplicity of the structure. In one embodiment, the wheels and rails are both in the form of mouldings or extrusions.

In addition to the use of the invention to provide a carriage for a sprayer boom, other applications of the invention in agricultural situations include carriages for a controlled weeding implement, a fertiliser placement implement, and a seeding device. Applications outside agriculture include rail-type transport systems.

An embodiment of the invention will now be described by way of example with reference to the accompanying drawings in which.

Figures 1, 2:
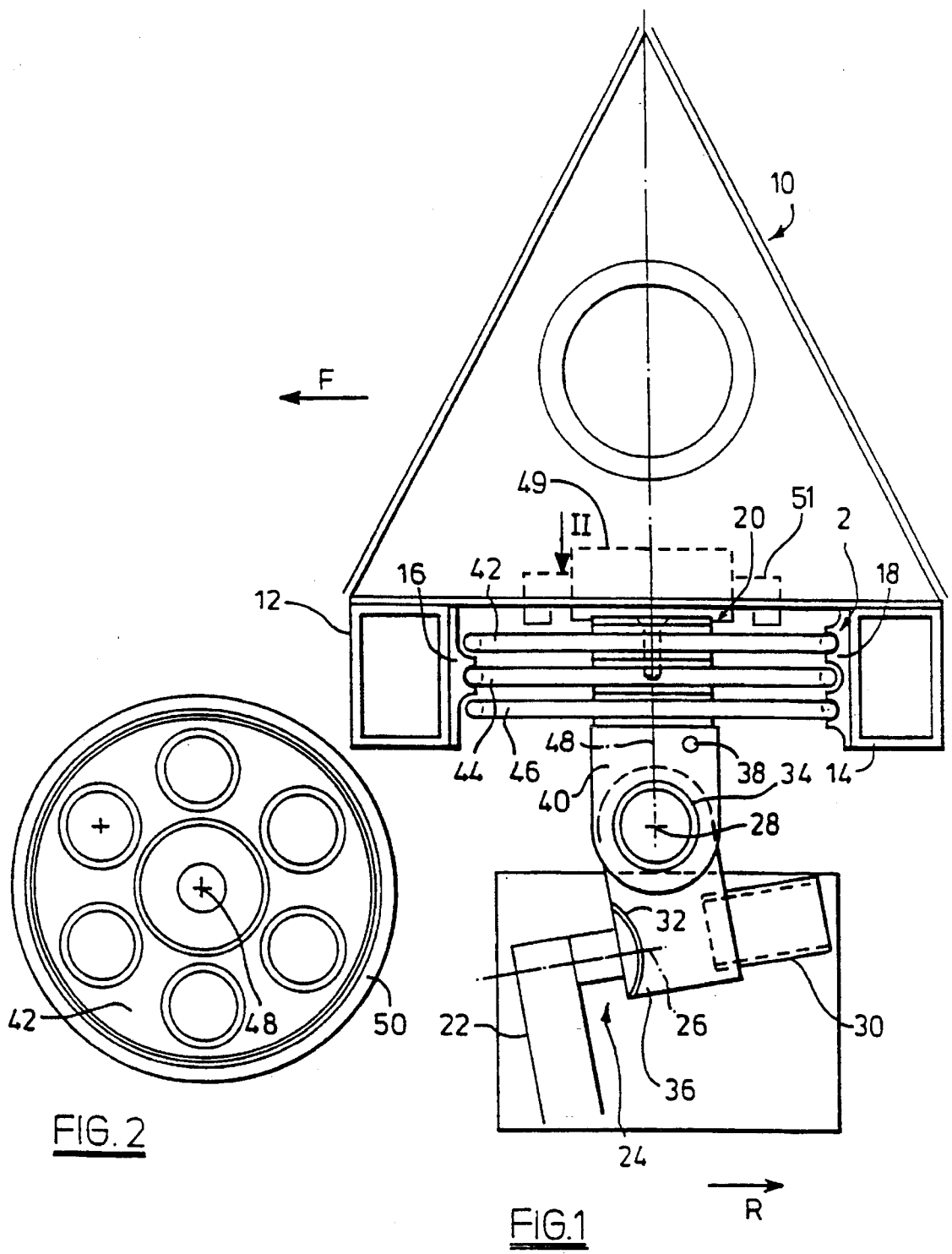
FIG. 1 shows a vertical section through the boom of a sprayer implement.
FIG. 2 shows a plan view of a wheel assembly also seen in FIG. 1, the direction of viewing being indicated in FIG. 1 by the arrow II.

As shown in the drawings, a sprayer boom 10 is of generally triangular cross-sectional shape and comprises lengthwise-extending box sections 12, 14 providing mountings for rails 16, 18 between which a wheel assembly 20 is mounted.

The wheel assembly 20 provides a mounting for spraying droplegs 22 as described in more detail below. Droplegs 22 depend below boom 10 as indicated in FIG. 1 and provide a mounting for spray nozzles (not shown). The Droplegs are supported on their respective wheel assemblies 20, through universal mountings 24 permitting lateral pivotal movement of the droplegs about respective axes 26, and about a common transverse axis 28 permitting fore and aft pivotal movement. A torsion spring (not shown) mounted on a tubular mounting 30 cooperates with a pair of wavy discs 32 to provide a preferred central attitude with respect to axis 26. Likewise, a torsion spring (not shown) wrapped around a tube 34 and acting between a mounting head 36 and a bore 38 in a hub member 40 serves to hold head 36 (and hence its dropleg 22) in a preferred position from which it can be resiliently deflected in the rearward direction R by dynamic forces in use.

Turning now to wheel assembly 20, it will be seen that it comprises three wheel members 42, 44, 46 mounted for rotation about a common axis 48, and each having a rubber tire 50 for driving engagement with either rail 16 or rail 18, as shown in FIG. 1.

As also shown in FIG. 1, the rails 16 and 18 have profiled and dimensioned inner surfaces for making contact with and providing clearance from the tires of the wheel memebers, as indicated. Thus, upper wheel member 42 and lower wheel member 46 both make contact with rail member 18, whereas the middle wheel member 44 makes contact only with rail member 16. Thus, middle rail member 16 contra-rotates, in use, with respect to the other two wheel members. Each wheel member makes contact only with one rail member, and at the other side of the wheel member there is clearance. In this way, a compact and stable mounting is provided, which is particularly advantageous for a carriage assembly for the boom 10, and like applications.

A drive 49 for wheel assembly is provided in the form of an electric motor mounted directly on the wheel assembly above wheel member 42.

Torque control means 51 such as, for example, a brake or clutch, may be provided to control movement of the wheel head along the rails as previously described. In use, the wheel assembly and the dropleg mounted thereon, readily respond to drive signals given to the motor by its control system, whereby the droplegs are maintained in the precise required position with respect to the length of the boom 10.

Amongst modifications which could be made in the above embodiment while remaining within the scope of the invention are the use of just two wheels in the wheel assembly or more than three. Usually, the wheels will be arranged in alternately contra-rotating relative disposition. Modifications to the rail profiles can be readily envisaged. Greater and lesser clearance between the rails and the wheel members than that shown can likewise be envisaged.

Figure 3:
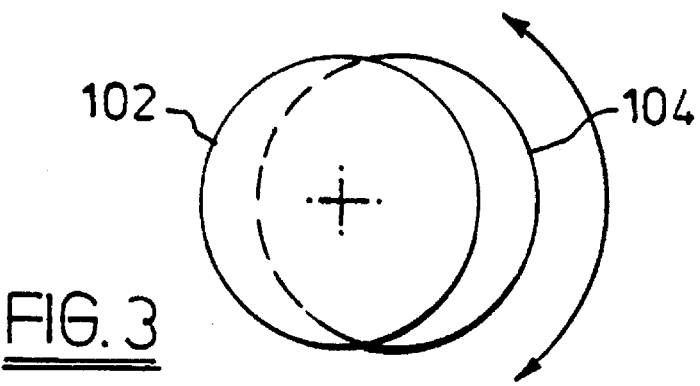
FIGS. 3 and 4 show, respectively, axial and radial views of a modified wheel assembly having a common adjustment axis but with the wheels disposed with their rotation axes offset from each other.
Figure 4:
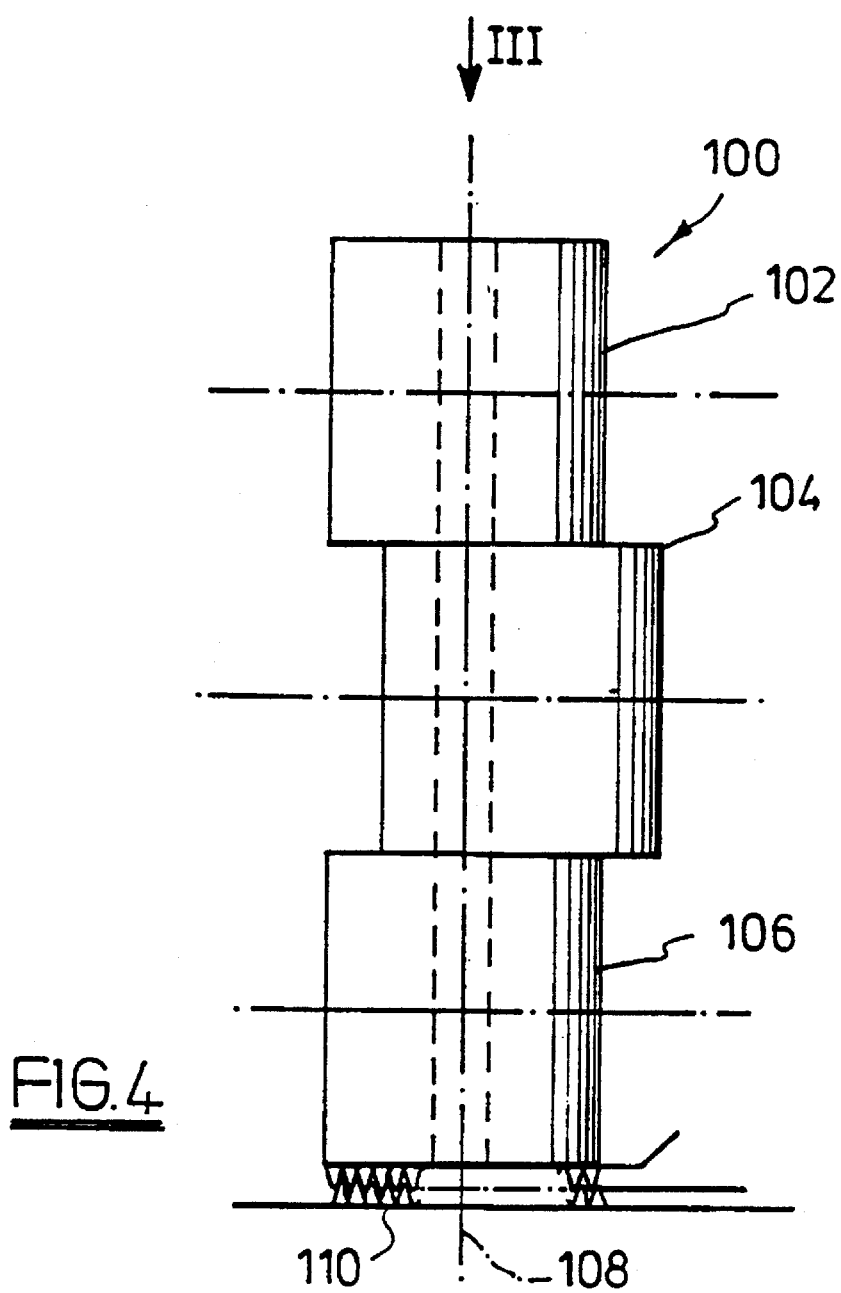

In a further embodiment shown in FIGS. 3 and 4, the wheel assembly 100 is modified by having the three wheels 102, 104, 106 disposed so that their axes of rotation are not coincident, and thus as seen in axial view, the wheels are not in alignment. However, the wheels have a common adjustment axis 108 about which the assembly can be turned to adjust the clearances between the wheels and the respective rails, not shown.

Thus, this embodiment provides a simple means whereby the wheels may be adjusted with respect to the rails. In order to maintain a given chosen state of adjustment, a ratchet 110 may be provided, or alternatively a spring device (not shown) may be provided to spring-urge the assembly into contact with the respective rails.

In this embodiment, the bearing assemblies of the three wheels may be secured together with the desired degree of offset between the rotation axes.

The advantage of this embodiment lies in the fact that the tolerances for the relative dispositions of the rails are less critical.

I claim:

1. A wheel head (20) and rail (16, 18) assembly comprising:
   a) an assembly (20) of at least three wheels (42, 44, 46) comprising two co-rotational outer wheels (42, 46) and a counter-rotational central wheel (44);
   b) a pair of spaced rails (16, 18);
   c) said assembly of wheels being mounted between said rails for contra-rotation of said wheels about respective axes (48) to co-operate with said rails;
   d) said wheels of said assembly being axially offset with respect to each other lengthwise of their respective rotation axes so as to be capable of effecting said contra-rotation;
   e) said wheels being also disposed in overlapping relationship as viewed in the lengthwise direction of their axes (48) and with the rotation axis of each wheel passing through each other wheel;
   f) a drive for at least one of said wheels;
   g) each of said wheels having a radially outwardly-facing driving periphery having a curved profile as viewed in radial cross-section for driving engagement with a complimentary surface on its respective one of said rails; and
   h) each of said rails being adapted to co-operate with its respective wheel by being formed with a radially inwardly-facing formation having a curved profile as viewed in radial cross-section, complimentary to said curved profile of said wheel and with which said driving periphery of said wheel co-operates, whereby said wheel is located against radially outward movement by said driving co-operation of said driving periphery with said radially inwardly facing formation of said rail, and said wheel is located against movement in both axial directions by co-operation of said complimentary curved profiles of said wheel and said rail.

2. A wheel head (20) assembly according to claim 1 characterized by said assembly consisting of said three wheels (42, 44, 46).

3. An assembly according to claim 2 characterised by said axes of rotation of said wheels being coincident.

4. An assembly according to claim 3 further including torque control means for said wheels.

5. An assembly according to claim 3 wherein said wheels include tires for contact with said rails.

6. An assembly according to claim 5 characterised by said tires being removable from said wheels.

7. An assembly according to claim 1 characterised by said axes being spaced apart and including an adjustment device (110) to position-adjust said wheels about a common adjustment axis.

8. A wheel head (20) for a wheel head and rail assembly comprising:
   a) an assembly (20) of at least three wheels (42, 44, 46) to co-operate with a pair of spaced rails the assembly 20 comprising two co-rotational outer wheels (42, 46) and a counter-rotational central wheel (44);
   b) said assembly of wheels being adapted to be mounted between said rails for contra-rotation of said wheels about respective axes to co-operate with said rails;
   c) said wheels of said assembly being axially offset with respect to each other lengthwise of their respective rotation axes so as to be capable of effecting said contra-rotation;
   d) said wheels being also disposed in overlapping relationship as viewed in the lengthwise direction of their axes (48) and with the rotation axis of each wheel passing through each other wheel;
   e) a drive for at least one of said wheels;
   f) each of said wheels having a radially outwardly-facing driving periphery having a curved profile as viewed in radial cross-section for driving engagement with a complimentary surface on its respective one of said rails; and
   g) each of said rails being adapted to co-operate with its respective wheel by being formed with a radially inwardly-facing formation having a curved profile as viewed in radial cross-section, complimentary to said curved profile of said wheel and with which said driving periphery of said wheel co-operates, whereby said wheel is located against radially outward movement by said driving co-operation of said driving periphery with said radially inwardly facing formation of said rail, and said wheel is located against movement in both axial directions by co-operation of said complimentary curved profiles of said wheel and said rail.

9. In combination, a wheel head (20) and rail (16, 18) assembly upon which is mounted a carriage (36, 40) which carries a spray nozzle member (22) for use as an agricultural crop sprayer, said wheel head and rail assembly comprising:
   a) an assembly (100) of at least three wheels (102, 104, 106), said assembly (100) comprising two co-rotational outer wheels (102, 106) and a contra-rotatable central wheel (104);

b) a pair of spaced rails (16, 18);

c) said assembly being mounted between said rails for contra-rotation of said wheels about respective axes to co-operate with said rails;

d) said wheels of said assembly being axially offset with respect to each other lengthwise of their respective rotation axes so as to be capable of effecting said contra-rotation;

e) said wheels being also disposed in overlapping relationship as viewed in the lengthwise direction of their axes and with the rotation axis of each wheel passing through each other wheel;

f) a drive for at least one of said wheels;

g) each of said wheels having a radially outwardly-facing driving periphery having a curved profile as viewed in radial cross-section for driving engagement with a complimentary surface on its respective one of said rails; and h) each of said rails being adapted to co-operate with its respective wheel by being formed with a radially inwardly-facing formation having a curved profile as viewed in radial cross-section, complimentary to said curved profile of said wheel and with which said driving periphery of said wheel co-operates, whereby said wheel is located against radially outward movement by said driving co-operation of said driving periphery with said radially inwardly facing formation of said rail, and said wheel is located against movement in both axial directions by co-operation of said complimentary curved profiles of said wheel and said rail;

i) said axes of rotation of said wheels being no coincident; and j) said wheels having an adjustment device (110) being provided to position-adjust said wheels about a common adjustment axis.

* * * * *